United States Patent
Hannig

(10) Patent No.: US 10,011,702 B2
(45) Date of Patent: Jul. 3, 2018

(54) WEAR-PROTECTION LAYER WITH ELLIPSOIDAL SOLID MATERIAL PARTICLES

(71) Applicant: SURFACE TECHNOLOGIES GMBH & CO. KG, Baruth (DE)

(72) Inventor: Hans-Jurgen Hannig, Bergisch Gladbach (DE)

(73) Assignee: Surface Technologies GmbH & Co. KG, Baruth (DE)

( * ) Notice: Subject to any disclaimer, the term of this patent is extended or adjusted under 35 U.S.C. 154(b) by 147 days.

(21) Appl. No.: 14/436,564

(22) PCT Filed: Oct. 23, 2013

(86) PCT No.: PCT/EP2013/072213
§ 371 (c)(1),
(2) Date: Apr. 17, 2015

(87) PCT Pub. No.: WO2014/086532
PCT Pub. Date: Jun. 12, 2014

(65) Prior Publication Data
US 2015/0284573 A1 Oct. 8, 2015

(30) Foreign Application Priority Data
Dec. 5, 2012 (EP) .................................... 12195583

(51) Int. Cl.
| | | |
|---|---|---|
| C08K 3/38 | (2006.01) | |
| C08K 3/14 | (2006.01) | |
| C08K 3/22 | (2006.01) | |
| C08K 3/28 | (2006.01) | |
| C09D 7/61 | (2018.01) | |
| B32B 37/06 | (2006.01) | |
| B44C 5/04 | (2006.01) | |
| B32B 38/00 | (2006.01) | |
| C08K 3/34 | (2006.01) | |

(52) U.S. Cl.
CPC ............... *C08K 3/38* (2013.01); *B32B 37/06* (2013.01); *B32B 38/0008* (2013.01); *B44C 5/0476* (2013.01); *C08K 3/14* (2013.01); *C08K 3/22* (2013.01); *C08K 3/28* (2013.01); *C08K 3/34* (2013.01); *C09D 7/61* (2018.01); *B32B 2307/554* (2013.01); *B32B 2310/0806* (2013.01); *B32B 2419/04* (2013.01); *C08K 2003/2227* (2013.01); *C08K 2003/2244* (2013.01); *Y10T 156/10* (2015.01); *Y10T 428/25* (2015.01); *Y10T 428/2982* (2015.01)

(58) Field of Classification Search
None
See application file for complete search history.

(56) References Cited

U.S. PATENT DOCUMENTS

| | | | |
|---|---|---|---|
| 3,928,706 A * | 12/1975 | Gibbons | ............... B44C 5/0476 156/228 |
| 5,344,704 A | 9/1994 | O'Dell et al. | |
| 5,492,769 A * | 2/1996 | Pryor | ....................... B05D 5/02 428/552 |
| 7,303,813 B2 | 12/2007 | Kunz | |
| 8,313,824 B2 | 11/2012 | Yokochi et al. | |
| 2007/0104928 A1* | 5/2007 | Yokochi | .................. B32B 27/08 428/204 |
| 2007/0231551 A1 | 10/2007 | Hama | |
| 2009/0087643 A1 | 4/2009 | Gottzmann et al. | |
| 2013/0062005 A1 | 3/2013 | Iizuka et al. | |

FOREIGN PATENT DOCUMENTS

| | | |
|---|---|---|
| CN | 201850734 U | 6/2011 |
| CN | 102557647 A | 7/2012 |
| DE | 19508797 C | 8/1996 |
| DE | 19604907 A1 | 8/1997 |
| EP | 0519242 A1 | 12/1992 |
| EP | 1886838 A2 | 2/2008 |
| EP | 2119550 A1 | 11/2009 |
| WO | 9700172 | 1/1997 |

OTHER PUBLICATIONS

"Mohs' Hardness (Typical) of Abrasives," obtained Mar. 15, 2017, Reade Advanced Materials, http://www.reade.com/reade-resources/reference-educational/reade-reference-chart-particle-property-briefings/32-mohs-hardness-of-abrasives.*
Abstract of CN102557647; Nov. 7, 2012.
Abstract of CN201850734; Jan. 6, 2011.
Abstract of DE 19604907, 1 page.
International Search Report, PCT/EP2013/072213, dated Dec. 3, 2013, 2 pages.
Written Opinion, PCT/EP2013/072213, dated Dec. 3, 2013, 5 pages.
International Preliminary Report on Patentability, PCT/EP2013/072213, dated Jun. 9, 2015, 7 pages.

* cited by examiner

*Primary Examiner* — Sheeba Ahmed
(74) *Attorney, Agent, or Firm* — Senniger Powers LLP

(57) ABSTRACT

A wear protection layer comprising ellipsoidal solid particles, wherein the ellipsoidal solid particles have the shape of a spheroid or a triaxial ellipsoid. A method for manufacturing a wall, ceiling or floor panel, comprising the steps of providing a plate-shaped carrier, applying a decorative layer onto the carrier, and applying a wear protection layer onto the decorative layer, wherein for applying the wear protection layer a heat and/or radiation curable monomer and/or oligomer composition comprising ellipsoidal solid particles is applied which is at least partially cured by heat and/or irradiation of electromagnetic radiation of a suitable wavelength.

22 Claims, 1 Drawing Sheet

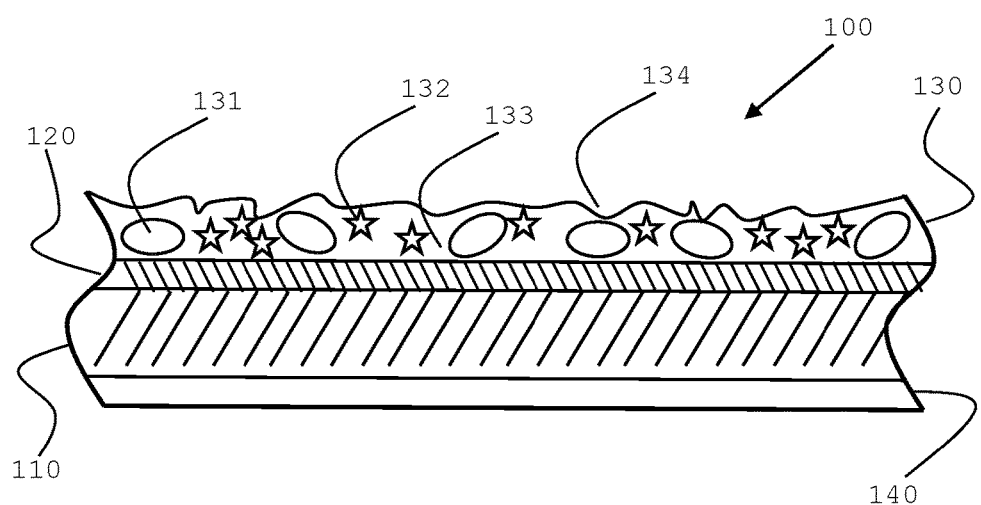
Fig. 1
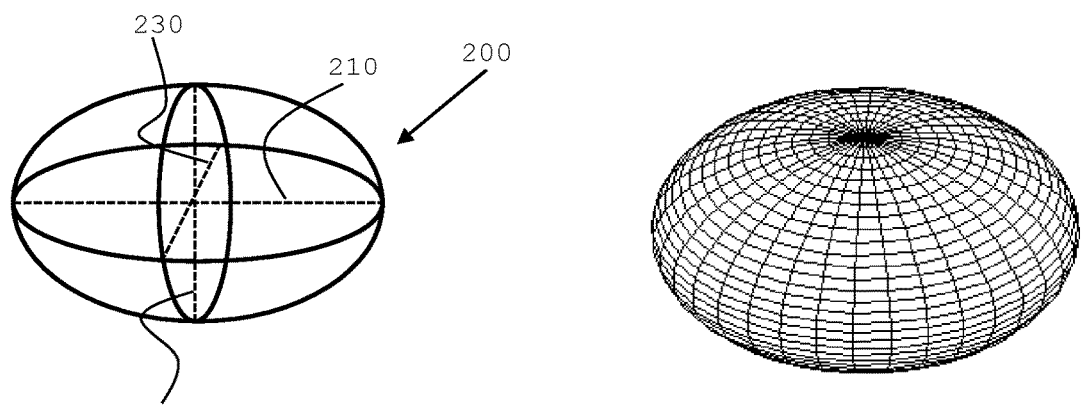
Fig. 2A
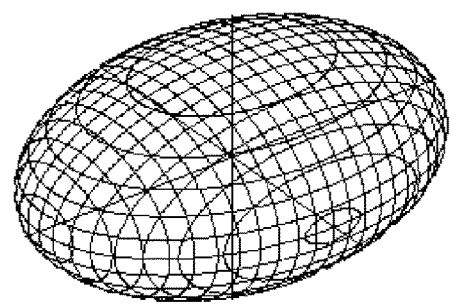
Fig. 2B
Fig. 2c

WEAR-PROTECTION LAYER WITH ELLIPSOIDAL SOLID MATERIAL PARTICLES

REFERENCE TO RELATED APPLICATIONS

This application is a U.S. national stage application of International Patent Application No. PCT/EP2013/072213, filed Oct. 23, 2013, and claims the benefit of priority of European Application No. 12195583.5, filed Dec. 5, 2012, the entire disclosures of which are incorporated herein by reference.

FIELD OF THE INVENTION

The present invention relates to a wear protection layer for a wall, ceiling or floor panel. Hereinafter, such panels are generally called as decorative panel.

BACKGROUND OF THE INVENTION

European patent application EP 0 519 242 A1 describes a wear protection layer for a decorative panel comprising silane coated hard material particles and a compacting agent and a lubricant.

U.S. Pat. No. 3,928,706 discloses a method for producing wear protection coatings consisting of a core paper, a decorative paper, a wearing layer and an overlay paper. The wearing layer, which consists of a thermosetting synthetic resin, a water-insoluble hard material finely dispersed therein having a Mohs hardness of at least 7 and cellulose fibers also finely dispersed therein, is either applied onto a surface of the decorative paper or the overlay paper. All three papers are impregnated with a thermo-setting synthetic resin and are processed in a conventional manner to a single laminate by compressing them at temperatures of about 150° C. between highly polished die plates.

DE-A-196 04 907 describes a method for producing an abrasion resistant sheet, in which the paper in the course of the production process even before the drying process is coated directly with a slurry containing relatively crude, abrasion resistant particles as well as a binder. As hard material particles, for example, silica, alumina, alundum, corundum, emery, spinel and various carbides are cited.

WO 97/00172 describes a method in which an overlay paper for the manufacture of abrasion resistant laminates is coated on both sides with hard material particles.

A disadvantage of the wear protection layers known from the prior art is, however, that the pressing tools during the compressing of the laminate become heavily scratched or worn by the hard material particles contained in the wear protection layer. This occurs both in the highly polished mirror surfaces of the pressure plates used in the discontinuous operation and in the surfaces of the pressing belts used in the continuous operation, such that the pressing tools rapidly become unusable and must be replaced. This leads to significant costs.

EP 1339545 B1 discloses a wear protection layer based on a synthetic resin, which in addition to hard material particles includes spherical solid particles, such as glass beads. A disadvantage in the use of such glass beads is that the decor image can become optically impaired. In particular, an optical impairment caused by the glass beads used can result in problems with respect to the alignment of the texture to be introduced within the surface relative to the decor image.

DE-C-195 08 797 tries to solve the wear problem during the production in that the decorative paper is provided with an abrasion resistant layer, without applying a corresponding prefabricated overlay paper by compression, by adjusting the viscosity of the synthetic resin for the coating of the decorative paper so that the finished decorative paper has a smooth, abrasion-resistant layer from which hard particles no longer protrude. A high viscosity, however, leads to entrapped air and thus a lack of transparency of the layer. The problem of wear of the pressing tools is not solved in this way, because during the final assembly under the usual pressing conditions there is still a contact between the mirror surface of the pressing tool and the hard material.

U.S. Pat. No. 5,344,704 describes a way for reducing the wear of the pressing tools in that pre-cured resin particles are incorporated together with the hard material particles. If these pre-cured resin particles, however, are to protect the pressing tools, they have to be greater than the hard material particles. However, because the resin particles do not have a sufficient hardness, the abrasion resistance of the wearing layer is greatly reduced. If the pre-cured resin particles are of equal or less size than the hard material particles the pressing tools can no longer or only insufficiently be protected. A further disadvantage is that the melamine resins usually used achieve the high transparency required for a high-quality decorative layer only if they are completely cured under pressure. Thus, it appears that both the mechanical strength and the decorative effect are problematic.

SUMMARY OF THE INVENTION

Taking this into account it is an object of the present invention to provide a wear protection layer which is capable of overcoming the disadvantages known from the prior art. Moreover, it is an object of the present invention to provide a method for producing such decorative panels including such a wear protection layer.

These objects are achieved by a wear protection layer comprising ellipsoidal solid particles, wherein the ellipsoidal solid particles have the shape of a spheroid or a triaxial ellipsoid; and by a method for manufacturing a wall, ceiling or floor panel, comprising the steps of providing a plate-shaped carrier, applying a decorative layer onto the carrier, and applying a wear protection layer onto the decorative layer, wherein for applying the wear protection layer a heat and/or radiation curable monomer and/or oligomer composition comprising ellipsoidal solid particles is applied which is at least partially cured by heat and/or irradiation of electromagnetic radiation of a suitable wavelength.

BRIEF DESCRIPTION OF THE DRAWINGS

FIG. 1 shows a schematic cross-section of an embodiment of a wear protection layer according to the invention in a multilayer laminate.

FIG. 2A shows an example of the geometry of solid particles to be provided in a wear protection layer according to the present invention.

FIGS. 2B and 2C show examples of perspective views of a solid particle comprising the shape of a triaxial ellipsoid (2B) and a spheroid (2C).

DETAILED DESCRIPTION OF PREFERRED EMBODIMENTS

Thus, the term decorative panel in the sense of the invention means wall, ceiling or floor panels comprising a decor applied onto a carrier plate. Decorative panels are used in a variety of ways both in the field of interior design of rooms and for decorative cladding of buildings, for example in exhibition stand construction. One of the most common uses of decorative panels is their use as a floor covering. In order to improve the resistance of the decorative panels, these often comprise a wear protection layer. A wear protection layer according to the invention is a layer applied as an outer border which in particular protects the decorative layer from wear or damage by dirt, moisture or mechanical impacts such as abrasion.

Herein, the decorative panels often comprise a decor intended to replicate a natural material. Examples of such replicated natural materials are wood species such as maple, oak, birch, cherry, ash, walnut, chestnut, wenge or even exotic woods such as Panga Panga, mahogany, bamboo and bubinga. In addition, often natural materials such as stone surfaces or ceramic surfaces are replicated.

Heretofore, such decorative panels have often been produced as laminates in which a decorative paper pre-printed with a desired decor is applied onto a carrier plate and, in turn, a so-called overlay is applied onto the decorative paper. After optionally a backing paper has been applied to the side of the carrier plate opposite to the decorative paper, the laminate structure obtained is fixedly bonded together by use of appropriate pressure and/or heat-activated adhesives.

As an alternative for the production of a decorative panel the carrier plate can be printed directly, for example, by means of digital, offset or flexographic printing methods. Herein, in the sense of the invention direct printing of the panel also means printing of a primer previously applied onto the carrier. Such a primer may consist of a composition applied onto the carrier as a liquid or pasty phase and subsequently cured or of a non-woven fabric or paper layer not yet printed with a decor. An overlay can be applied onto such a printed panel, too, and the layer structure thus formed can be bonded together by heat and/or pressure.

The plate-shaped carrier of the decorative panel is preferably formed of a material which is selected from the group consisting of wood, wood-based material, fiber material, plastic, glass, stone, ceramic, mineral material or mixtures thereof.

Wood-based materials in the sense of the invention in addition to solid wood materials are materials such as cross-laminated timber, glue-laminated timber, blockboard, veneered plywood, laminated veneer lumber, parallel strand lumber and bending plywood. In addition, wood-based materials in the sense of the invention are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereto, and minerally hardened, for example with cement, chipboards are wood-based materials in the sense of the invention. Moreover, cork represents a wood-based material in the sense of the invention.

In the sense of the invention the term fiber materials means materials such as paper and non-woven fabrics on the basis of plant, animal, mineral or even synthetic fibers as well as cardboards. Examples are fiber materials on the basis of plant fibers and, in addition to papers and non-woven fabrics made of cellulose fibers, boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

Examples of plastic materials which may serve as carrier materials are thermoplastic plastic materials such as polyvinyl chloride, polyolefines (such as polyethylene (PE), polypropylene (PP)), polyamides (PA), polyurethanes (PU), polystyrene (PS), acrylonitril butadiene styrene (ABS), polymethyl methacrylate (PMMA), polycarbonate (PC), polyethylene terephthalate (PET), polyether ether ketone (PEEK) or mixtures or co-polymerizates thereof. The plastic materials can include common fillers, such as calcium carbonate (chalk), aluminum oxide, silicagel, quartz powder, wood flour, gypsum. In addition they can be coloured in a known way. In particular it can be provided that the carrier material comprises a flame inhibitor.

In the sense of the invention the term stone and ceramic materials means materials such as granite, marble, sandstone, slate, tile, porcelain stoneware tiles and the like. Mineral materials in the sense of invention are, for example, plasterboard, cement or concrete slabs or mixed material sheets made of synthetic resin and mineral additives.

In order to improve the wear resistance the wear protection layer can include wear-resistant particles, such as hard material particles. One example of such wear-resistant particles are corundum particles.

Thus, a wear protection layer is proposed which includes ellipsoidal solid particles.

Here, solid particles are particles having a Mohs hardness of at least ≥5, preferably ≥6. Preferably these particles are transparent or at least translucent particles, such as ellipsoidal glass or quartz particles.

It has surprisingly been found that by the use of ellipsoidal solid particles on the one hand an excessive wear of the pressing tools can be avoided, and on the other hand the ellipsoidal solid particles exhibit, at least for the use of transparent or translucent particles, an advantageous optical behavior such that no unwanted distortions occur. Rather, it has been found that due to the ellipsoidal configuration the solid particles have the effect of a lens, whereby attractive appearances of the surface can be achieved.

As described above, the layered structure of the laminate is bonded together by heat and/or pressure. It is assumed, that the ellipsoidal solid particles provided in the wear protection layer according to the invention orient such that their main axis is substantially oriented parallel to the plane of the carrier.

According to one embodiment of the invention it may be provided that instead of or in addition to an overlay layer a varnish layer is applied onto the panel. Herein, it may be provided that such a varnish layer is formed from a varnish which is physically setting, for example by means of heat, and, for example, water-based or based on an organic solvent, or from a varnish curable by means of irradiation with electromagnetic radiation of an appropriate wavelength, such as a UV varnish. In such an embodiment the ellipsoidal solid particles are part of the varnish layer and contribute to the improvement of the abrasion resistance of this layer.

The decor underlying the wear protection layer according to a preferred embodiment of the invention is applied onto the carrier plate by means of printing, preferably direct printing. Herein, in the sense of the invention direct printing also includes the application of the decor by means of printing techniques onto a printable layer previously applied onto the carrier. Such a printable layer can e.g. be formed by a liquidly applied and subsequently cured primer layer or a previously applied printable foil, paper or non-woven fabric layer. Herein, the primer layer can, for example, be formed from a curable and printable polymer composition, such as polyacrylate, polypropylene, polyethylene, polyurethane acrylate or the like which is applied onto the carrier plate as a suitable pre-polymer composition and is cured thereon by suitable means such as electromagnetic radiation or heat into a corresponding layer. A suitable printable film layer may for example consist of a plastic material such as polyacrylate, polypropylene, polyethylene, polyurethane acrylate or the like, which can be applied onto the carrier. Suitable papers are e.g. those used as a starting material for pre-printed decorative papers. Suitable nonwoven fabric layers are e.g. those based on plant, animal, mineral or synthetic fibers.

According to one embodiment of the invention, the wear protection layer consists of a polymer matrix, in which at least the ellipsoidal solid particles are incorporated. In this case, the polymer matrix can be formed of a heat and/or radiation curable monomer and/or oligomer composition by heat exposure and/or exposure to electromagnetic radiation of a suitable wavelength. Examples of appropriate curable polymer precursors are, for example, phenolic resin, epoxy resin, polyester resin, polycarbonate, diallyl phthalate resin, polyurethane resin, melamine resin, urea resins such as formaldehyde resin, or mixed resins such as phenol-formaldehyde resin or melamine-formaldehyde resin. Likewise it may be provided that the polymer matrix is formed of a radiation curable varnish, such as a UV-curable acrylic varnish. Herein, radiation curable means in the sense of the invention that the composition forming the later polymer matrix is radically polymerized by exposure to electromagnetic radiation of a suitable wavelength, such as e.g. UV radiation or IR radiation, or even ion beams and thereby forms the desired polymer matrix.

According to a further embodiment of the invention the wear protection layer in addition to the ellipsoidal solid particles comprises hard material particles, wherein the hard material particles have a Mohs hardness of at least $\geq 8$, preferably at least $\geq 9$. Examples of suitable hard materials are titanium nitride, titanium carbide, silicon nitride, silicon carbide, boron carbide, tungsten carbide, tantalum carbide, alumina (corundum), zirconium oxide, zirconium nitride or mixtures thereof. Hereby the wear resistance of the layer is further increased.

According to a further embodiment of the invention, the ellipsoidal solid particles have the shape of a spheroid or a triaxial ellipsoid. A spheroid in the sense the invention means an ellipsoid with two minor axes of identical length, whereas a triaxial ellipsoid is an ellipsoid whose minor axis have different lengths. Surprisingly it has been shown that both spheroids and triaxial ellipsoids assume a favorable orientation when the composite layer structure of a laminate is cured under heat and/or pressure. While the solid particles of the ellipsoids are statistically oriented within the uncured wear protection layer, i.e. the main axis of the ellipsoid is statistically oriented parallel to plane of the layers of the laminate as well as orthogonal or at least antiparallel with respect to this plane, they orient themselves substantially parallel to the plane of the layers of the laminate under pressure and/or heat exposure. This orientation movement leads to a damping effect during the pressing of the layer package of which the laminate is formed, which can lead to less wear of the pressing tools.

According to a further preferred embodiment of the invention, the ratio between the average length of the major axis of the ellipsoidal solid particles and at least one of its minor axis is at least $\geq 1.2$, preferably $\geq 1.3$, more preferably $\geq 1.5$, in particular $\geq 2$. If the ratio of the axis lengths relative to each other is selected in this range, in an advantageous way a good damping effect during the compression of the layer package is achieved.

According to a further preferred embodiment of the invention it is provided that the average length of the major axis of the ellipsoidal solid particles is greater than the average particle diameter of the hard material particles optionally to be provided in the wear protection layer. Preferably, the ratio between the average length of the major axis of the ellipsoidal solid particles and the average grain diameter of the hard material particles is in a range between $\geq 1.0$ and $\leq 4.0$, preferably between $\geq 1.05$ and $\leq 3.0$, more preferably between $\geq 1.1$ and $\leq 2.5$, particularly preferably between $\geq 1.2$ and $\leq 2.0$, for example between $\geq 1.5$ and $\leq 1.8$. The average grain diameter is thereby taken into account as a numeral average over all grain sizes.

Herein, in accordance with a preferred embodiment of the invention it is provided that the average length of the major axis of the ellipsoidal solid particles is in a range between $\geq 10$ µm and $\leq 375$ µm, preferably between $\geq 10$ µm and $\leq 150$ µm.

In a further embodiment of the invention it is provided that the ratio between the proportion of solid particles and hard material particles in the wear protection layer is between $\leq 10:1$ and $\geq 0.1:10$, preferably between $\leq 5:1$ and $\geq 0.5:10$, particularly preferably between $\leq 1:1$ and $\geq 1:10$.

According to a further embodiment of the invention the total amount of solid particles and hard material particles in the wear protection layer can be in a range between $\geq 5$ wt.-% and $\leq 40$ wt.-%, preferably $\geq 15$ wt.-% and $\leq 25$ wt.-%. It has been found that such an amount on the one hand offers a very good wear resistance of the laminate and on the other hand ensures a high transparency of the wear protection layer, so that the laminate can meet today's optical requirements.

Furthermore, according to the present invention a method for producing a wall, ceiling or floor panel is provided, comprising the steps of:

providing a plate-shaped carrier;
applying a decorative layer onto the carrier;
applying a wear protection layer onto the decorative layer, characterized in that for applying the wear protection layer a heat and/or radiation curable monomer and/or oligomer composition containing ellipsoidal solid particles, is applied, which is at least partially cured by heat and/or irradiation of electromagnetic radiation of a suitable wavelength.

Furthermore according to the present invention it can be provided that in the course of the at least partial curing of the wear protection layer a texture substantially matching with the decor is introduced into the surface of the wear protection layer.

In a further embodiment of the invention the plate-shaped carrier can comprise a profile at least in an edge region. Herein, it can be particularly provided that the decor is applied in the region of the profile, too, such that the profiling process is carried out prior to the application of the decorative layer onto the plate-shaped carrier. As an alternative or in addition the profiling process can be carried out subsequently to the application of the decorative layer. In profiling according to the invention it is provided that by means of suitable machining tools at least in a part of the edges of the decorative panel a decorative and/or functional profile is produced. Herein, a functional profile means, for example, the production of a groove and/or tongue profile within an edge in order to allow decorative panels to be connected to each other by means of the produced profiles. A decorative profile in the sense of the invention, for example, is a chamfer formed at the edge region of the decorative panel, for example, in order to simulate a joint between two interconnected panels, after they have been connected to each other such as in so-called wide planks.

By partially profiling the decorative panel not all profiles to be provided in the finished panel are produced, but only part of the profiles, while other profiles are produced in a subsequent step. Thus, it may be provided, for example, that the decorative profile to be provided in a panel, such as a chamfer, is produced in one step, while the functional profile, e.g. groove/tongue, is produced in a subsequent step.

By applying the decor subsequently to the at least partially profiling of the carrier, for example, by means of the above-described methods, such as direct printing, abrasion or damage of the decor in the course of the profiling process can be avoided in an advantageous way. Thus, the decor also in the regions of the profile corresponds in detail to the desired imitation, for example, of a natural material.

The wear protection layer, for example, can be applied as a liquid composition onto the carrier printed with the decor and cured thereon. Herein, it may be provided that the solid/hard material is included in the wear protection layer composition in an amount between 5 wt.-% and 40 wt.-%, preferably between 15 wt.-% and 25 wt.-%. Preferably, the hard material has a mean grain diameter between 10 µm and 250 µm, more preferably between 10 µm and 100 µm. In this way it is advantageously achieved that the wear protection layer composition forms a stable dispersion and a decomposition or precipitation of the solid/hard material in the wear protection layer composition can be avoided. For forming a corresponding wear protection layer in one embodiment of the invention it is provided that the heat or radiation curable composition including the solid/hard material is applied at a concentration between 10 $g/m^2$ and 250 $g/m^2$, preferably between 25 $g/m^2$ and 100 $g/m^2$. In this case, the application can be implemented, for example, by means of rollers such as rubber rollers, or by means of pouring devices. According to a further embodiment of the invention it can be provided that the solid/hard material is not included within the composition at the time of application of the wear protection layer composition, but is scattered in the form of particles onto the applied wear protection layer composition and subsequently the wear protection layer is cured. Likewise, it may be provided that the wear protection layer is laid onto the printed carrier as a prefabricated overlay layer and bonded thereto by means of pressure and/or heat.

As already mentioned according to a further embodiment of the invention it can be provided that the wear protection layer has a surface texture substantially matching with the decor of the decorative layer. A surface texture substantially matching with the decor of the decorative layer means that the surface of the decorative panel has a haptically perceivable structure which with respect to its shape and pattern corresponds to the applied decor in order to achieve a reproduction of a natural material as close to the original as possible even with respect to the haptic. Herein, it may be provided that the carrier plate already has a texture and an alignment of a printing tool for applying the decor with respect to the carrier plate is implemented depending on the texture of the carrier plate which is detected, for example, by means of optical methods. Herein, for aligning the printing tool and the carrier plate relative to each other it can be provided that a relative movement between the printing tool and the carrier plate necessary for the alignment is implemented by shifting the carrier plate or by shifting the printing tool. According to another embodiment of the invention it is provided that a texturing of the decorative panel is implemented subsequently to the application of the wear protection layer. To this end it may be preferred to apply a settable composition as the wear protection layer and a curing process is done solely to the extent that only a partial curing of the wear protection layer is achieved. In the thus partially cured layer by means of appropriate tools, such as a hard metal texture roller or a die, a desired surface texture is embossed. Herein, the embossing process is implemented in correspondence with the applied decor. In order to ensure a sufficient correspondence of the texture to be produced with the decor it may be provided that the carrier plate and the embossing tool are aligned relative to each other by corresponding relative movements. Subsequently to the production of the desired texture within the partially cured layer a further curing step is implemented with respect to the now textured wear protection layer.

FIG. 1 shows a schematic cross-section of an embodiment of a wear protection layer 130 according to the invention in a multilayer laminate 100. The laminate 100 in the embodiment shown consists of a plate-shaped carrier 110 onto which a decorative layer 120 is applied. A wear protection layer 130 according to the present invention is applied on the decorative layer 120. On the side of the plate-shaped carrier 110 opposite to the wear protection layer 130 a backing paper 140 is applied. The plate-shaped carrier 110 can be formed of a material which is selected from the group consisting of wood, wood-based material, fiber material, plastic, glass, stone, ceramic, mineral material or mixtures thereof. The decorative layer 120 can either be applied onto the plate-shaped carrier 110 as a preprinted decorative paper or can be directly printed onto the plate-shaped carrier 110 by direct printing. Herein, in the sense of the invention direct printing also includes printing of a print primer previously applied onto the plate-shaped carrier 110, such as an unprinted paper or a primer layer. The wear protection layer 130 in the embodiment shown comprises ellipsoidal solid particles 131. The ellipsoidal solid particles 131 may have the form of a triaxial ellipsoid or a spheroid. The ellipsoidal solid particles 131 preferably have a Mohs hardness of at least ≥5. Preferably the hardness of the solid particles 131 is <8 on the Mohs hardness scale. Examples of materials for the solid particles 131 include glass, quartz or polymer plastic materials which have a corresponding Mohs hardness. In addition to the ellipsoidal solid particles 131 the wear protection layer 130 comprises hard material particles 132. The hard material particles 132 preferably have a Mohs hardness of at least ≥8. Examples of suitable materials of which the hard material particles 132 can consist include titanium nitride, titanium carbide, silicon nitride, silicon carbide, boron carbide, tungsten carbide, tantalum carbide, alumina (corundum), zirconia and zirconium or mixtures thereof. Preferably the hard material particles have a mean particle diameter (mean grain size distribution) which is smaller than the average length of the major axis of the ellipsoidal solid particles 131. The solid particles 131 and the hard material particles 132 are embedded in the wear protection layer 130 within a polymer matrix 133. Herein, the polymer matrix 133 can consist both of a thermosetting plastic material, such as e.g. melamine resin or melamine formaldehyde resin, and of a radiation curable polymer, such as e.g. an acrylate. At the side of the wear protection layer 130 opposite to the plate-shaped carrier 110, i.e. the effective area, the wear protection layer can have a texture 134 which is preferably produced substantially in correspondence with the decor of the decorative layer 120. The ratio between the proportion of solid particles and hard material particles in the wear protection layer can preferably be between ≤10:1 and ≥0.1:10. The entire proportion of solid particles and hard material particles in the wear protection layer can preferably be between ≥5 wt.-% and ≤40 wt.-%. In a preferred embodiment of the invention at least the decorative layer 120 and the backing layer 140 can be applied onto the plate-shaped carrier 110 in a common calendaring step.

FIG. 2A shows an example of the geometry of a solid particle 200 to be provided according to the invention in a wear protection layer. The ellipsoidal solid particle 200 has a major axis 210 and minor axes 220 and 230. In the case of a triaxial ellipsoid the lengths of all three axes, that is the main axis 210 as well as the minor axes 220 and 230, are different. In the case of a spheroid, the lengths of the major axis 210 and the minor axis 230 are identical, while the minor axis 220 is shorter. In the ellipsoidal solid particles to be provided according to the invention in a wear protection layer the ratio between the length of the major axis 210 and at least one of its minor axis 220 or 230 in the average is preferably at least ≥1.2. The average length of the major axis 210 is preferably in a range between ≥10 μm and ≤375 μm. FIGS. 2B and 2C show a modeled perspective view of a triaxial ellipsoidal or a spheroidal solid particle.

The invention claimed is:

1. Wear protection layer for a wall, ceiling or floor panel, characterized in that the wear protection layer comprises triaxial ellipsoidal solid particles;
   wherein the triaxial ellipsoidal solid particles are made of glass and have a Mohs hardness of ≥5 and <8;
   wherein the wear protection layer in addition to the triaxial ellipsoidal solid particles comprises hard material particles;
   wherein the hard material particles have a Mohs hardness of ≥8;
   wherein the hard material particles comprise a material selected from the group consisting of titanium nitride, titanium carbide, silicon nitride, silicon carbide, boron carbide, tungsten carbide, tantalum carbide, alumina (corundum), zirconium oxide, zirconium nitride or mixtures thereof;
   wherein the ratio between the average length of the major axis of the triaxial ellipsoidal solid particles and at least one of its minor axis is at least 1.2;
   wherein the average length of the major axis of the triaxial ellipsoidal solid particles is between 10 and 375 μm; and
   wherein the average length of the major axis of the triaxial ellipsoidal solid particles is larger than the average grain diameter of the hard material particles.

2. Wear protection layer according to claim 1, wherein the triaxial ellipsoidal solid particles are embedded in a polymer matrix.

3. Wear protection layer according to claim 2, wherein the polymer matrix is made of a heat and/or radiation curable monomer and/or oligomer which is cured by heat and/or irradiation of electromagnetic radiation of an appropriate wavelength.

4. Wear protection layer according to claim 1, wherein the hard material particles are made of titanium nitride.

5. Wear protection layer according to claim 1, wherein the ratio between the proportion of triaxial ellipsoid solid particles and hard material particles in the wear protection layer is between ≤10:1 and ≥0.1:10.

6. Wear protection layer according to claim 1, wherein the total amount of triaxial ellipsoid solid particles and hard material particles in the wear protection layer is between ≥5 wt. % and ≤40 wt. %.

7. A panel for a wall, ceiling or floor, the panel comprising a carrier and the wear protection layer according to claim 1.

8. Wear protection layer of claim 1:
   wherein the wear protection layer comprises a heat-curable polymer matrix in which the triaxial ellipsoidal solid particles and hard material particles are embedded;
   wherein the triaxial ellipsoidal solid particles and hard material particles constitute between 5 and 40 wt % of the wear protection layer.

9. Wear protection layer of claim 8 wherein the triaxial ellipsoidal solid particles and hard material particles constitute between 15 and 25 wt % of the wear protection layer.

10. Wear protection layer of claim 8 wherein the average length of the major axis of the triaxial ellipsoidal solid particles is between 10 μm and 150 μm.

11. Wear protection layer of claim 8 wherein the triaxial ellipsoidal solid particles have an average major axis length and an average minor axis length, and a ratio of the average major length axis to average minor length axis of at least 2.

12. Wear protection layer of claim 1:
   wherein the wear protection layer comprises a heat-curable polymer matrix in which the triaxial ellipsoidal solid particles and hard material particles are embedded;
   wherein the hard material particles have a Mohs hardness of at least ≥9;
   wherein the triaxial ellipsoidal solid particles and hard material particles constitute between 15 and 25 wt % of the wear protection layer;
   wherein the triaxial ellipsoidal solid particles have an average major axis length and an average minor axis length, and a ratio of the average major length axis to average minor length axis of at least 2; and
   wherein the average major length axis of the triaxial ellipsoidal solid particles is between 10 μm and 150 μm.

13. Wear protection layer of claim 1 wherein the hard material particles comprise titanium carbide.

14. Wear protection layer of claim 1 wherein the hard material particles comprise silicon nitride.

15. Wear protection layer of claim 1 wherein the hard material particles comprise silicon carbide.

16. Wear protection layer of claim 1 wherein the hard material particles comprise boron carbide.

17. Wear protection layer of claim 1 wherein the hard material particles comprise tungsten carbide.

18. Wear protection layer of claim 1 wherein the hard material particles comprise corundum.

19. Wear protection layer of claim 1 wherein the hard material particles comprise zirconium oxide.

20. Wear protection layer of claim 1 wherein the hard material particles comprise zirconium nitride.

21. The wear protection layer of claim 1 wherein the wear protection layer comprises:
   a polymer matrix; and
   said solid triaxial ellipsoid glass particles having Mohs hardness of ≥5 and <8 and said hard material particles having Mohs hardness of ≥8 in a cumulative proportion of between 5 wt. % and 40 wt. % of the wear protection layer;
   wherein a ratio between the proportion of said solid particles and said hard material particles in the wear protection layer is between ≤10:1 and ≥0.1:10.

22. The wear protection layer of claim 1 wherein the wear protection layer consists of:
   a polymer matrix; and said solid triaxial ellipsoid glass particles having Mohs hardness of ≥5 and <8 and said hard material particles having Mohs hardness of ≥8 in a cumulative proportion of between 15 wt. % and 25 wt. % of the wear protection layer;

wherein a ratio between the proportion of said solid particles and said hard material particles in the wear protection layer is between ≤10:1 and ≥0.1:10.

* * * * *